April 28, 1959 D. H. PRITCHARD 2,884,482
COLOR TELEVISION
Filed Nov. 15, 1954
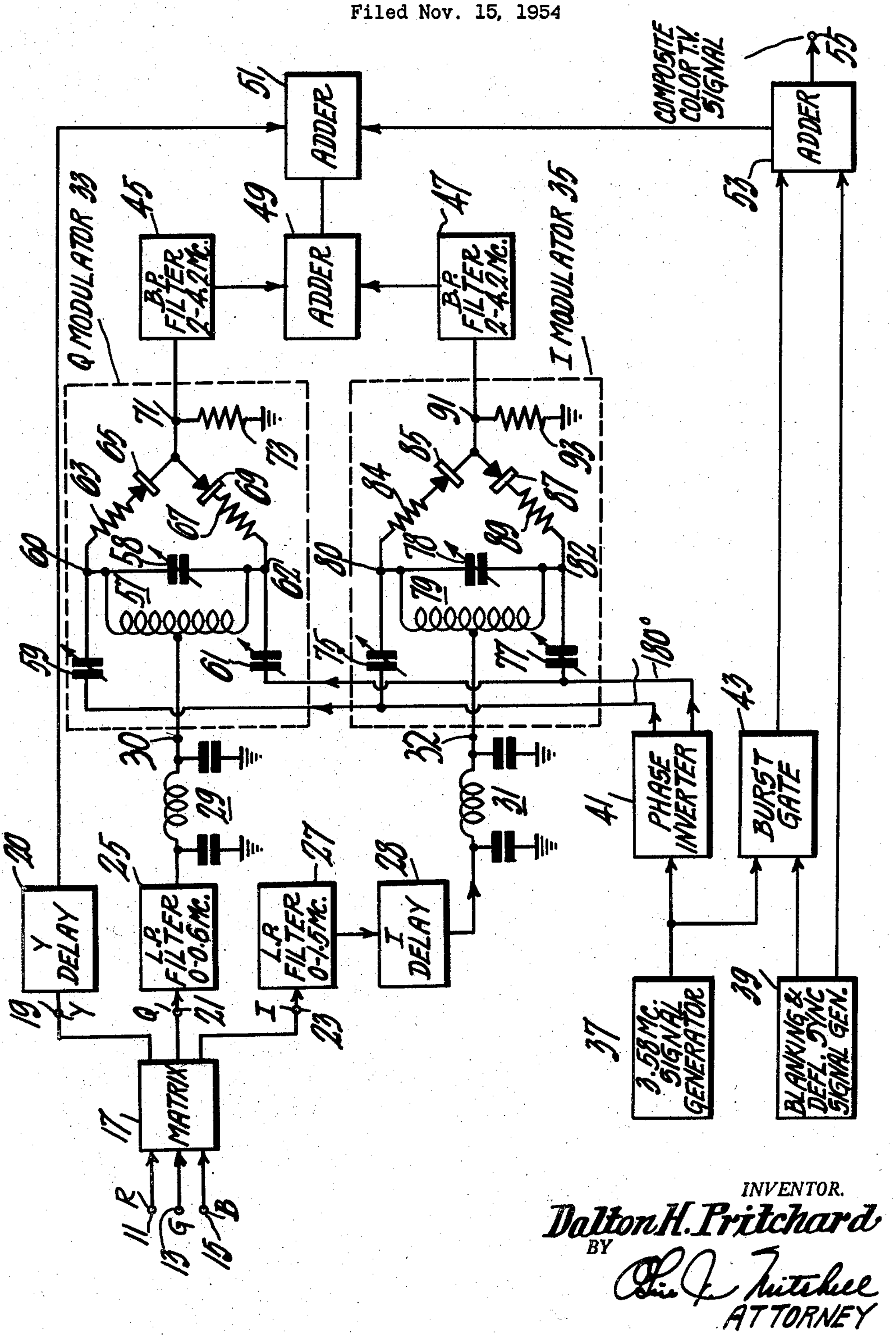
INVENTOR.
Dalton H. Pritchard
BY
[signature]
ATTORNEY 2,884,482

COLOR TELEVISION

Dalton Harold Pritchard, Princeton, N.J., assignor to Radio Corporation of America, a corporation of Delaware Application November 15, 1954, Serial No. 468,807

7 Claims. (Cl. 178—5.4)

The present invention relates to balanced modulators and more particularly to balanced modulator circuits utilized in color television transmitter encoders or colorplexer circuits.

The composite color signal is made up of wide band luminance signal component information which contains brightness and fine detail information having frequency components extending to 4 mcs. The composite color signal also contains a chrominance signal component in the form of a phase and amplitude modulated subcarrier wave having a fundamental frequency of 3.58 mcs. The instantaneous phase of the wave is caused to represent color or hue while the envelope amplitude, when considered in combination with the luminance signal amplitude, is caused to represent the degree of color saturation.

The chrominance signal is formed by modulating a sinusoidal wave form having a frequency of 3.58 mcs. and having a specific phase relationship to a color synchronizing reference 3.58 mcs. burst phase. The sinusoidal wave is modulated by a plurality of low frequency color difference signals formed by a matrix circuit fed by three simultaneous signals representing the red, green and blue color content of the image scanned. The color difference signals describe how each color in the televised scene differs from the color content of the corresponding color in the luminance signal. Thus, the output of any one modulator unit consists of modulation products and at a specific phase relationship with respect to the color synchronizing burst. The outputs of at least two modulator units may then be combined to form a complete chrominance signal having both phase and amplitude variations which correctly represent the hue and saturation information to be transmitted. Since neither the low frequency color difference input signals nor the 3.58 mc. reference signal appear in the output signal of the modulators, the modulators may either be doubly balanced or be balanced for the 3.58 mc. reference signal and be capable of removing the low frequency signal input by appropriate band pass or high pass filters.

It is an object of this invention to provide a simplified modulator circuit for forming a chrominance signal in a color television transmitter.

It is another object of this invention to provide a simplified rectifier modulator circuit for use in forming the chrominance signal of a composite color television signal.

It is a still further object of this invention to provide a rectifier modulator circuit which may be utilized to form a suppressed-carrier-color-difference signal modulated color subcarrier.

According to the invention, a modulated subcarrier may be formed by passing the modulating signal through a pair of transmission paths, each of which includes a rectifier. The subcarrier is impressed on to one path in one phase, and on to the other path 180° out of phase, for simultaneously and intermittently keying the rectifiers into conduction; the output of both paths, when combined, will then cancel the subcarrier and yield only the modulation products and the modulating signal. The modulating signal is removed by passing the output signal through a band pass circuit capable of passing only the modulation products. A plurality of modulated-subcarriers may be formed independently, each utilizing a subcarrier of prescribed phase modulated by different modulating signals. The products of modulation are then combined to yield a combined modulated-subcarrier containing both phase and amplitude variations denoting intelligence.

Other and incidental objects of this invention will become apparent upon a reading of the following specifications and a study of the drawing wherein there is included a circuit, utilizing modulators which perform according to the teachings of the present invention, to produce a composite color television signal.

Consider the circuit shown in the figure. The red, green and blue color representative simultaneous signals are fed to the input terminals 11, 13 and 15 of the matrix 17; the output of the matrix 17 yields a luminance or Y signal at the output terminal 19 and selected color difference signals at the output terminals 21 and 23.

The matrix 17 consists of a plurality of resistance elements cross-connected between certain of the input terminals and the output terminals to form any desired combination of color signals or color difference signals at the terminals 19, 21 and 23. Details concerning the matrix, as well as specific values of resistance, may be found in an article entitled "The Colorplexer—A Device for Multiplexing Color Television Signals in Accordance With the NTSC Signal Specifications," by Gloystein and Turner, published in the RCA Review for January 1954.

It has been shown by numerous experiments that the human eye has increased acuity for color information along an orange-cyan axis in the chromaticity diagram. In order to take advantage of this fact, the color difference signals chosen to form the chrominance signal may include one or more color difference signals which are not of the red, green and blue color difference signal variety. One pair of color difference signals which may be used, are the so-called I and Q signals where the I signal represents color difference signal information along the orange-cyan axis and the Q signal represents color difference signal information along substantially a green-purple color axis. By proper design of the matrix 17, the Q signal is then caused to appear at the output terminal 21 and the I signal is caused to appear at the output terminal 23. It is to be noted at this point that the phases of the I and Q signals in the final chrominance signal are such that the I signal lags the burst or reference phase by 57° with the Q signal lagging the I signal by 90°.

The band width of the Q signal is limited to approximately 0.6 mc., by passing the Q signal through the low pass filter 25 and the filter 29 to the terminal 30.

The band width of the I signal is limited to 1.5 mcs. and delayed an amount that the Q signal is delayed in filter 25, by passing the I signal through the low pass filter 27, the I delay line 28 and the filter 31 to the terminal 32.

Subscriber signals from the 3.58 mcs. signal generator 37 are applied to a phase inverter 41 to produce push-pull signal 180° out of phase. The filtered Q signal, which is delivered to terminal 30, and the push-pull subcarrier from the phase inverter 41, are then impressed on a Q modulator 33 to form a Q signal modulated subcarrier. In like fashion the filtered I signal is delivered to terminal 32 and impressed on an I modulator 35 along with the push-pull version of the subcarrier from the phase inverter 41 to form an I signal modulated subcarrier. The Q signal modulated subcarrier is limited by the band pass filter 45 to the frequency range from approximately 3–4.2 mcs. and the I signal modulated subcarrier is limited in frequency to the range from 2 to 4.2 mcs. by the band pass filter 47. The output of the band pass filters 45 and 47 are thereupon applied to the adder 49 wherein a complete chrominance signal is formed. The complete chrominance signal is applied to the adder 51 wherein it is combined with the Y signal which has been delayed in delay circuit 20 by an amount which will make its time delay correspond to the time delay of the I and Q signals. The output signal of adder 51 is then applied to the adder 53 wherein the blanking pulses as well as the horizontal and vertical deflection synchronizing pulses are combined with the output of adder 51. The horizontal and vertical synchronizing pulses are provided by the blanking and deflection sync signal generator 39. Color synchronizing bursts are furnished by the 3.58 mc. signal generator 37 through the burst gate 43 to provide approximately 8 cycles of the burst reference phase 3.58 mc. reference signal on the back porch portion of the horizontal blanking interval. The output signal of the adder 53 is then the complete composite color television signal.

Consider now the operation of the Q modulator 33 whose schematic diagram is included in the drawing. The Q modulator 33 utilizes a resonant circuit 57 which is tuned to substantially 3.58 mcs. The resonant circuit 57 has an end terminal 60 coupled to terminal 71 through a resistor 63 and a two-terminal non-linear impedance such as a rectifier 65. End terminal 62 is coupled to terminal 71 through resistor 67 and a rectifier 69 that is polarized oppositely to the rectifier 65. Terminal 71 is coupled to ground through the resistor 73 to provide a load circuit for the modulator 33. Subcarrier signals having a frequency of 3.58 mcs. and a phase difference of 180° are applied through the condensers 59 and 61 to the end terminals 60 and 62 respectively. Note that the anode of rectifier 65 is coupled to the terminal 71 while the cathode of the rectifier 69 is coupled to this same terminal 71. The condenser 58 of the resonant circuit 57 is then detuned so that a Q-phase subcarrier signal will appear at the end terminal 62 while a —Q phase subcarrier signal will appear at the end terminal 60. (Q phase lags burst phase by 147° while —Q phase leads burst phase by 33°.) The push-pull action of the Q and —Q phase signals at the end terminals 62 and 60 respectively will then cause the anode of the rectifier 69 to rise in potential while the cathode of the rectifier 65 will go through a corresponding decrease in potential during prescribed intervals of the Q phase subcarrier. During portions of the positive ½ cycle of the Q phase subcarrier both of the rectifiers 65 and 69 will be keyed on and caused to conduct simultaneously. The rectifier 65 will be provided with a bias furnished by the time constant path made up primarily of the condenser 59 and the resistor 63. The rectifier 69 will be provided with a bias furnished by the time constant path made up primarily of the condenser 61 and the resistor 67. The biases developed by the time constant paths associated with the rectifiers 65 and 69 will then determine the conduction and timing intervals of these rectifiers; the bias developed at terminal 60 should be equal and opposite to the bias developed at terminal 62. The rectifiers 65 and 69 are simultaneously keyed on for appropriate conduction intervals which bear prescribed relationship to the phase with which the Q color difference signal is to be identified in the resulting modulated subcarrier. The rectifiers 65 and 69 may be considered to be keyed two-terminal nonlinear impedances. The Q color difference signal from the matrix will be multiplied by the Q phase subcarrier signal in the rectifier 69 while the same Q color difference signal will be mutliplied by the —Q phase subcarrier signal in the rectifier 65. It will now be apparent that the subcarrier signals that are applied in opposite phase to the rectifiers 65 and 69 are cancelled at the load 73, thereby developing a Q signal modulated subcarrier at the terminal 71 in addition to other signal components including the Q color difference signal. This signal, after being passed through the band pass filter 45 to remove the low frequency Q color difference signals, will contain only the modulation products resulting from the multiplication of the Q color difference signal with the Q and —Q phase subcarrier signals thereby yielding the Q signal modulated subcarrier at the output of filter 45.

The I modulator 35 functions according to the same principles prescribed with respect to the Q modulator 33 with the exception of the fact that the resonant circuit 79 is by adjustment of condenser 78 then tuned to provide an I phase subcarrier at the end terminal 82 and a —I phase subcarrier at the end terminal 80. (I phase lags burst phase by 57° while the —I phase leads burst phase by 123°.) product signal of the I color difference signal and the I phase subcarrier will then be developed across the rectifier 87 and the product signal of the I color difference signal and the —I phase subcarrier will be formed across the rectifier 85. The combination of the two signals provided by the rectifiers 85 and 87 will produce an I signal modulated subcarrier at the terminal 91 and at the output of the band pass filter 47.

Excellent control of the balance and the keying intervals of both the Q modulator 33 and the I modulator 35 is provided by adjustments of the capacitance of condensers 58 and 78 of the resonant circuits 57 and 79 and a phase shift circuit which may be provided at the phase inverter 41; control of the keying intervals is also provided by performing suitable adjustment of the coupling condensers 59 and 61, 75 and 77, which couple the signals from phase inverter 41 to the resonant circuits 57 and 79 respectively, and provide control of the time constants of the paths assoicated with the respective rectifiers so that the net D.C. voltage developed by the modulators at the terminals 30 and 32 is zero. This is an important function required of both the Q modulator 33 and the I modulator 35 if accurate representation of the steady state levels of both the I and the Q color difference signals is to be included in the chrominance signal. It is required, as has been mentioned, that for the Q modulator 33 the D.C. potential at the end terminal 60 should be equal in magnitude but opposite in sign to the D.C. potential provided at the end terminal 62 with reference to the potential developed at the terminal 30. In actual practice, it is difficult to construct a resonant circuit 57 wherein the midwinding connection is at the true electrical mean potential between the potentials developed at the end terminals 60 and 62. However, by suitable adjustments of the capacitance of the condensers 59 and 61 in the Q modulator 33, for example, the potential provided at the terminal 30 can be adjusted to a point where the true electrical mean potentials between the D.C. potential developed at the end terminals 60 and 62 is achieved.

Having described the invention, what is claimed is:

1. In a color television system, a modulator circuit comprising, a source of modulating waves, a source of subcarrier waves having a prescribed frequency and yielding at least a first and a second subcarrier oppositely phased with respect to each other, a first and a second non-linear impedance means each having two terminals, means for applying said modulating waves and said first subcarrier to one terminal of said first non-linear impedance means, means for applying said modulating waves and said second subcarrier to one terminal of said second non-linear impedance means, common impedance means connected to the other terminal of each of said non-linear impedance means for adding the waves produced by said first and second non-linear impedance means, an output circuit coupled to said common impedance means wherein a modulating-wave modulated subcarrier is produced.

2. In a color television system, a modulator circuit comprising, a source of modulating waves, a source of subcarrier waves having a prescribed frequency and yielding at least a first and a second subcarrier oppositely phased with respect to each other, a first and a second non-linear impedance means each having two terminals, means for applying said modulating waves and said first subcarrier to one terminal of said first non-linear impedance means, means for applying said modulating waves and said second subcarrier to one terminal of said second non-linear impedance means, common impedance means connected to the other terminal of each of said non-linear impedance means for adding the waves produced by the mixing actions in both said first and second non-linear impedance means, control means for adjusting the conduction characteristics of both said first and second non-linear impedance means, and an output circuit coupled to said common impedance means wherein a modulating-wave modulated subcarrier is produced.

3. In a color television system, a chrominance signal generator comprising the combination of, a first color difference signal source, a second color difference signal source, a color subcarrier signal generator including means for producing a first subcarrier signal having a first prescribed phase and a second subcarrier signal which is 180° out of phase with respect to said first subcarrier signal; a first modulator circuit and a second modulator circuit, each including a tunable resonant circuit having a resonant frequency substantially that of said subcarrier and having a centertap connection, a first end connection and a second end connection, an output terminal, said output terminal coupled to an output load, a first rectifier circuit coupled between said first end terminal of said tunable resonant circuit and said output terminal; a second rectifier circuit so coupled between said second end terminal of said tunable resonant circuit and said output terminal as to have an opposite direction of conduction as compared to the direction of conduction of said first rectifier circuit; means for coupling said first subcarrier signal to the first end connections of the tunable resonant circuits of both said first and second modulator circuits, means for coupling said second subcarrier signal to the second end connections of said tunable resonant circuits of both said first and second modulator circuits, means for coupling said first color difference signal source to the centertap connection of the tunable resonant circuit of said first modulator circuit, means for coupling said second color difference signal source to the centertap connection of the tunable resonant circuit to said second modulator circuit, filter and adder means having an output circuit and coupled to the output circuits of both said first and second modulator circuits to provide suitable addition of the signals provided at said output circuits within a predetermined band width, means for adjusting the tuning of the tunable resonant circuit of said first modulator circuit whereby a color subcarrier having a first predermined phase to be identified with said first color difference signal appears at said first end terminal and a color subcarrier having a phase 180° out of phase with respect to said first predetermined phase appearing at said second end terminal, and means for tuning said tunable resonant circuit of said second modulator circuit whereby a subcarrier signal having a second predetermined phase to be identified with said second color difference signal is produced at the first end terminal and a subcarrier signal having a phase 180° out of phase with respect to said second predetermined phase is produced at said second end terminal.

4. In a circuit for producing a color modulated subcarrier, the combination of: a first circuit to provide a first signal indicative of color information related to an image to be televised, a second circuit to develop a second signal comprising a subcarrier wave having a prescribed frequency, a first and second diode, means coupled between said first circuit and said first and second diodes to apply said first signal in the same phase to both said first and second diodes, means coupled between said second circuit and said first and second diodes to apply said second signal in one phase to said first diode and in opposite phase to said second diode whereby said first and second signals are mixed in said first and second diodes to produce modulation products of a first polarity and a carrier component of a first polarity across said first diode and to produce said modulation products of said first polarity and said carrier component of a second and opposite polarity across said second diode, and common output load means coupled to said first and second diodes to add said modulation products produced across said first and second diodes whereby the carrier components produced across said first and second diodes are cancelled leaving a signal representing said second signal modulated by said first signal with carrier components suppressed.

5. In a circuit for producing a color modulated subcarrier, the combination of: a first circuit to provide a first signal indicative of color information related to an image to be televised, a second circuit to develop a second signal comprising a subcarrier wave having a prescribed frequency, a first and second rectifier each having an anode and a cathode, a resonant circuit coupled to said second circuit and resonant at subcarrier frequency and operatively connected to develop first and second polarities of said second signal, means coupling said resonant circuit to said first and second rectifiers to apply a first polarity of said second signal to the anode of said first rectifier and to apply a second polarity of said second signal to the cathode of said second rectifier, a common output circuit coupled to the cathode of said first rectifier and to the anode of said second rectifier, and means coupling said first circuit to said second signal applying means to apply said first signal in the same phase to the anode of said first rectifier and the cathode of said second rectifier whereby modulation products of the same polarity between said first and second signals are produced across said first and second rectifiers and are developed across said common output circuit and whereby carrier components of opposite polarity are produced across said first and second rectifiers and are cancelled in said output circuit.

6. The circuit set forth in claim 4 wherein said first and second diodes are oppositely poled with respect to said common output load means.

7. A triangular bridge modulator circuit having an output terminal, a second terminal, and a third terminal, said output terminal being coupled to an output load, means for coupling a first rectifier between said output terminal and said second terminal, means for coupling a second rectifier between said output terminal and said third terminal, said first rectifier and said second rectifier so connected in said triangular bridge circuit that they are oppositely polarized with respect to said output terminal, a resonant circuit, said resonant circuit having a mid-terminal, means for coupling said resonant circuit between said second terminal and said third terminal, an input terminal, means for coupling said input terminal to said mid-terminal, and means for exciting said resonant circuit at a predetermined frequency and phase.

References Cited in the file of this patent

UNITED STATES PATENTS

| | | |
|---|---|---|
| 2,597,886 | McCoy | May 27, 1952 |
| 2,680,147 | Rhodes | June 1, 1954 |
| 2,718,546 | Schlesinger | Sept. 20, 1955 |
| 2,743,310 | Schroeder | Apr. 24, 1956 |

OTHER REFERENCES

Introduction to Color Television, Admiral Corp., February 1954, pages 17 to 27.